United States Patent
Santini (10) Patent No.: US 7,227,727 B2
(45) Date of Patent: Jun. 5, 2007

(54) METHOD AND APPARATUS FOR A SIDE-BY-SIDE THIN FILM HEAD WITH MINIMAL SEPARATION BETWEEN THE READ AND WRITE STRUCTURES

(75) Inventor: Hugo Alberto Emilio Santini, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 557 days.

(21) Appl. No.: 10/430,972

(22) Filed: May 7, 2003

(65) Prior Publication Data

US 2004/0223260 A1    Nov. 11, 2004

(51) Int. Cl.
  *G11B 5/39*   (2006.01)
  *G11B 5/127*  (2006.01)

(52) U.S. Cl. ................................. 360/317; 360/126

(58) Field of Classification Search ................ 360/313, 360/317, 318, 126
See application file for complete search history.

(56) References Cited

U.S. PATENT DOCUMENTS

| | | | |
|---|---|---|---|
| 5,285,341 A * | 2/1994 | Suzuki et al. ................ | 360/126 |
| 5,896,249 A | 4/1999 | Fontana, Jr. et al. | |
| 5,909,346 A | 6/1999 | Malhotra et al. | |
| 6,201,671 B1 | 3/2001 | Pinarbasi | |
| 6,329,211 B1 | 12/2001 | Terunuma et al. | |
| 6,985,330 B2 * | 1/2006 | Santini ........................ | 360/126 |

\* cited by examiner

*Primary Examiner*—William J Klimowicz
(74) *Attorney, Agent, or Firm*—David W. Lynch; Chambliss Bahner & Stophel (57) ABSTRACT

The present invention is a side-by-side inductive head structure having a considerably reduced separation between the read and write elements of the head structure for parallel as well as longitudinal recording.

17 Claims, 8 Drawing Sheets

METHOD AND APPARATUS FOR A SIDE-BY-SIDE THIN FILM HEAD WITH MINIMAL SEPARATION BETWEEN THE READ AND WRITE STRUCTURES

BACKGROUND OF THE INVENTION

1. Field of the Invention

This invention relates in general to magnetic recording systems, and more particularly to magnetic recording systems that use side-by-side read/write heads.

2. Description of Related Art

Fixed magnetic storage systems are now commonplace as a main non-volatile storage in modern personal computers, workstations, and portable computers. Storage systems are now capable of storing gigabyte quantities of digital data, even when implemented in portable computers.

Many important advances have been made that provide higher data density and thus increased storage capacities for storage systems. These advances include faster access speeds and faster access times resulting in a greater bandwidth of data communicated to and from the storage systems. Advances have also been made by greatly reducing the size and weight of the storage systems, resulting in the availability of ultra-light portable computers having state-of-the art capabilities and performance.

A disk drive is one example of a magnetic storage system. A disk drive storage system, for example, uses a rotatable disk with concentric data tracks containing information, a head for reading and/or writing data onto the various tracks, and an actuator connected to a sensor for moving the sensor to a desired track and maintaining the sensor over the track centerline during read and write operations. The sensor is suspended in close proximity to a recording medium. For example, the sensor may be suspended over a magnetic disk having a plurality of concentric tracks. Another type of magnetic storage system includes a magnetic tape system. However, storage systems are not limited merely to the above mentioned magnetic storage systems.

Disk drive storage systems utilize thin film head designs that are mostly variations of a merged design or a piggyback design. The merged design, as well as the piggyback design, places a write element atop a read sensor. In these dual-element designs, an inductive coil element used for writing and a magnetoresistive (MR) element used for reading are spaced apart from one another in a direction perpendicular to the trailing end of the merged head.

A problem with these dual-element head designs arises in rotary actuator disk drives. In rotary actuator disk drives the sensing ends of the read and write elements, coupled to the actuator, are not always aligned perpendicular to the data tracks. The elements are skewed relative to the tracks in which the amount of skew varies with radial position. This skewing is due to the inherent nonlinear path of the head as positioned relative to a recording medium's surface.

To compensate for skewing, the read and write elements may be slightly offset from one another in a direction parallel to the trailing end of the carrier, the amount of offset being determined by the average skew of the heads. However, this solution is only optimal at one specific angular position of the rotary actuator and becomes unacceptable at high track densities where the data tracks are very closely spaced.

Another problem with dual-element heads, whether in a rotary actuator disk drive or a linear tracking disk drive, is that because the read and write elements are closely spaced on top of one another on a slider, the magnetic field from an inductive write element can alter the magnetization state of a nearby magnetoresistive read element. Hence, commingling of magnetic fields produces unwanted magnetic instability in, for example, the read head functionality. Moreover, some magnetic flux does flow though the second shield (S2) and magnetoresistive layers even with increases in shield thickness and element separation.

Another drawback of the merged and piggyback designs is that the write head is positioned far from the large thermal heat sink of a thin film head's slider. Accordingly, the placement of write coils on top of a read head causes unwanted thermal effects prolonging heat dissipation. Also, the write head protrudes towards the air-bearing surface (ABS) causing a greater read element-to-ABS distance.

Side-by-side dual-element heads have been proposed to address these problems. In a side-by-side head, the write gap and the magnetoresistive sensing film of the MR read element are located in the same plane of the slider but are spaced apart from one another in a direction parallel to the slider trailing end. In this design, the read and write elements are not simultaneously located over the same track so it is necessary for the actuator to move the slider if read and write operations are to take place sequentially on the same track.

The side-by-side design may eliminate the magnetic coupling between the read and write heads and diminish the write head's protrusion (e.g., by placing the coils much closer to the slider). However, this design results in a loss of recorded density because of a very large separation between the read and write head pole tips; as separation and isolation between the read and write head poles increases, the loss of recorded density (i.e., transducer's ability to sense and write distinguishable transitions) increases.

One reason for this loss of recorded density is that the inside and outside tracks recorded onto a recording medium, such as a disk, are controlled by the placement of the read or write head in the side-by-side dual-head configuration. Accordingly, the total number of written tracks is reduced because the actuator positions one of the read or write poles of the side-by-side head closer to the inside or outside of the disk than the other head (at the limit of rotary travel). The head closest to the center of the disk, as viewed when the actuator is at the actuator's inner and outer limits on the disk surface, limits the ability of one side-by-side read or write head to read and write to both the innermost and outermost tracks. Accordingly, a loss of recorded density results from this inability to read and write to these innermost and outermost tracks.

It can be seen that there is a need for a method and apparatus for a side-by-side thin film head with minimal separation between the read and write structures.

SUMMARY OF THE INVENTION

To overcome the limitations in the prior art described above, and to overcome other limitations that will become apparent upon reading and understanding the present specification, the present invention discloses a method and apparatus for magnetic recording systems using side-by-side read/write heads.

The present invention solves the above-described problems by providing a side-by-side head structure having a considerably reduced separation between the read and write elements of a head structure. The present invention thus provides a reduction in the distance between tracks on a disk's surface. The side-by-side head is able to read and write to more of a recording medium's surface and thus increases the recording density of the system. Further, the invention maintains full thermal benefits of the heat dissipation of the write coils by placing the coils very close to the slider body.

A method of forming a side-by-side head structure in accordance with the principles of the present invention includes forming a read head having a read element disposed proximate an air bearing surface (ABS), forming a write coil, wherein the coil has a first side adjacent to the read head and a central axis, wherein the central axis is perpendicular to the ABS and forming a pole tip coupled to the write coil and offset from the central axis towards the read element to provide close proximity alignment between the read and write heads.

In another embodiment a side-by-side read/write head is provided. The side-by-side read/write head includes a read head having a read element formed proximate an air bearing surface (ABS) for detecting data written on a magnetic recording medium and a write head for recording data on a magnetic recording medium, the write head having a coil and a pole tip coupled thereto, wherein the coil has a first side and a central axis perpendicular to the ABS, the first side being adjacent to the read head, wherein the pole tip is disposed offset from the central axis towards the read element to provide close proximity alignment between the read and write heads.

In another embodiment a magnetic storage system is provided. The magnetic storage system includes a moveable magnetic storage medium, an actuator and a side-by-side read/write head coupled to the actuator, wherein the side-by-side read/write head further includes a read head having a read element formed proximate an air bearing surface (ABS) for detecting data written on a magnetic recording medium and a write head for recording data on a magnetic recording medium, the write head having a coil and a pole tip coupled thereto, wherein the coil has a first side and a central axis perpendicular to the ABS, the first side being adjacent to the read head, wherein the pole tip is disposed offset from the central axis towards the read element to provide close proximity alignment between the read and write heads.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings, which form a part hereof, and in which is shown by way of illustration the specific embodiment in which the invention may be practiced. It is to be understood that other embodiments may be utilized as structural changes may be made without departing from the scope of the present invention.

The present invention is a side-by-side head structure having a considerably reduced separation between the read and write elements of a thin film head. The side-by-side head is able to read and write to more of a recording medium's surface and thus increases the recording density of the system. Further, the structure is designed to maintain the full thermal benefits of write coil heat dissipation by placing the coils very close to the slider body.

Figure 1:
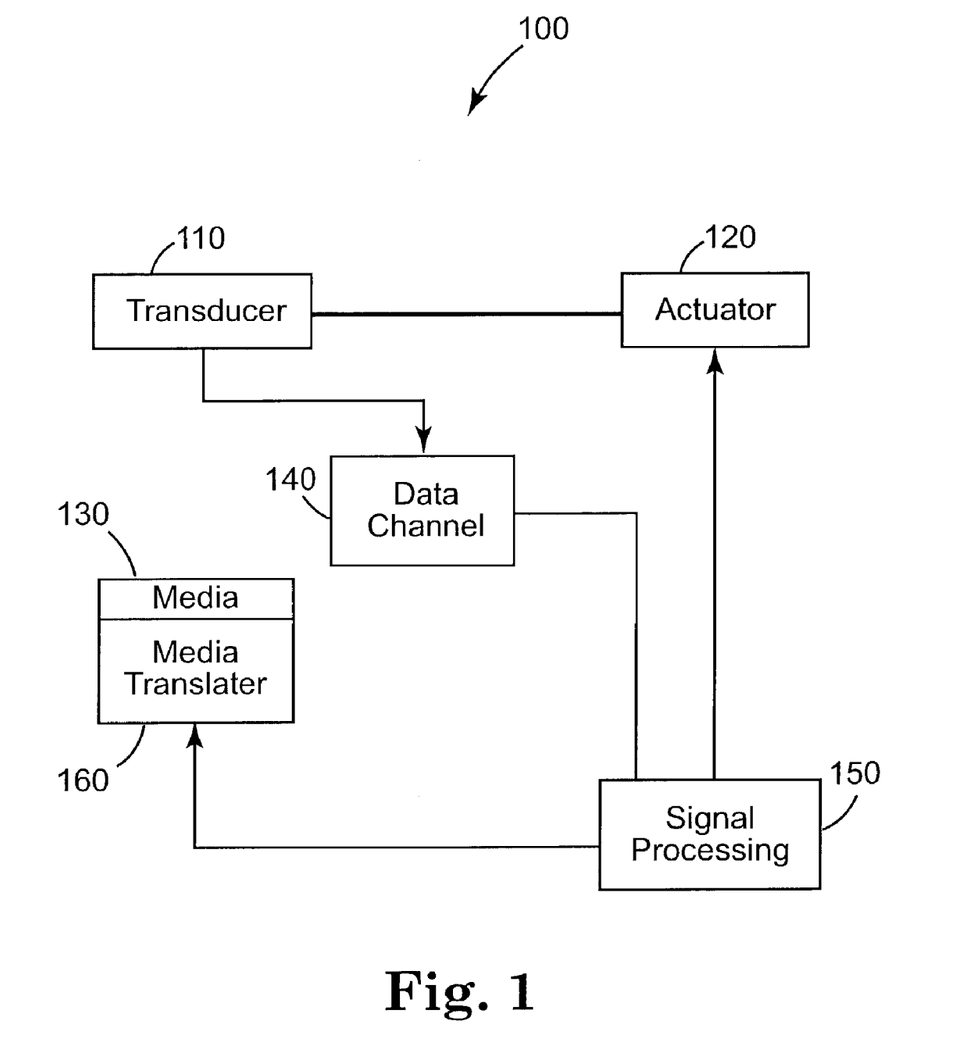
FIG. 1 illustrates a storage system.

FIG. 1 illustrates a storage system 100. In FIG. 1, a transducer 110 is under control of an actuator 120. The actuator 120 controls the position of the transducer 110. The transducer 110 writes and reads data on magnetic media 130. The read/write signals are passed to a data channel 140. A signal processor 150 controls the actuator 120 and processes the signals of the data channel 140. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
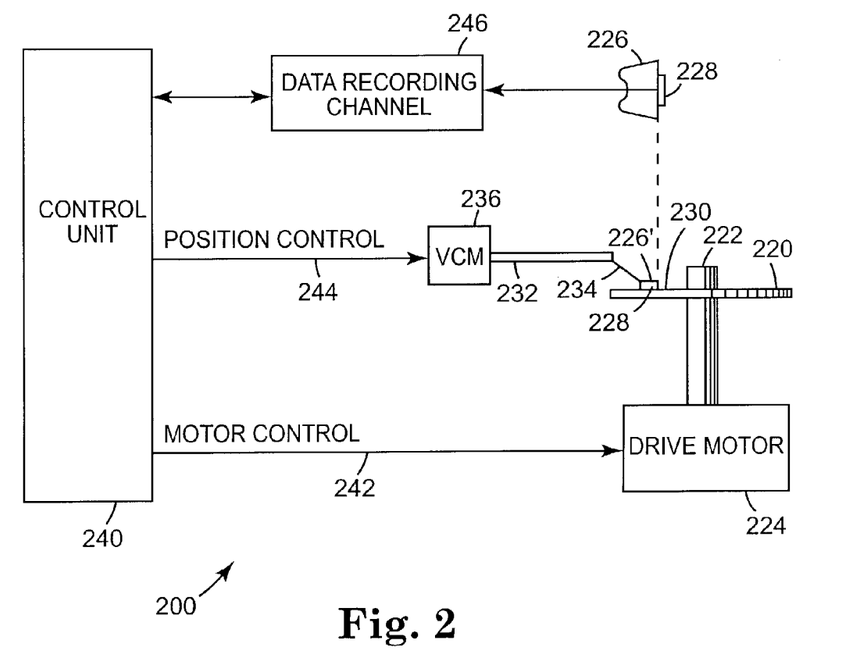
FIG. 2 is an illustration of one example of a magnetic disk drive storage system.

FIG. 2 is an illustration of one example of a magnetic disk drive storage system 200. As shown in FIG. 2, at least one rotatable magnetic disk 220 is supported on a spindle 222 and rotated by a disk drive motor 224. The magnetic recording media on each disk 220 is in the form of an annular pattern of concentric data tracks (not shown).

At least one slider 226 is positioned on the disk 220, each slider 226 supporting one or more magnetic read/write heads 228, wherein the heads 228 incorporate a side-by-side sensor of the present invention. As the disk(s) 220 rotate, slider 226 is moved in and out over disk surface 230 so that the heads 228 may access different portions of the disk 220 wherein desired data may be recorded or written. Each slider 226 is attached to an actuator arm 232 by means of a suspension 234. The suspension 234 provides a slight spring force, which biases the slider 226 against the disk surface 230. Each actuator arm 232 is attached to an actuator 236. The actuator 236 may, for example, be a voice coil motor (VCM). The direction and speed of the actuator is controlled by position signals 244 supplied by a control unit 240. However, those skilled in the art will recognize that the actuator may be a rotary or a linear actuator.

During operation of the disk drive 200, the rotation of the disk 220 generates an air bearing between the slider 226 and the disk surface 230, which exerts an upward force or lift on the slider 226. The surface of the slider 226, which includes the heads 228 and faces the surface of disk 220 is referred to as an air-bearing surface (ABS). The air bearing thus counter-balances the slight spring force of suspension 234 and, during normal operation, supports the slider 226 off of, and slightly above, the disk surface 230 at a small, substantially constant spacing.

The various components of the disk drive 200 are controlled in operation by control signals generated by a control unit 240, such as access control signals and internal clock signals. Typically, control unit 240 has logic control circuits, storage apparatus, and a microprocessor. The control unit 240 generates control signals to control various system operations such as position control signals 242 and motor control signals 244. The motor control signals 244 provide the desired profiles to optimally move and position the slider 226 to the desired data track on the disk 220. Read and write signals are communicated to and from the read/write heads 228 through a recording channel 246.

The above description of a typical magnetic disk drive storage system 200 is for representation purposes only. It should be apparent that disk storage systems may contain a large number of disks and actuators, and that each actuator may support a number of sliders. Many other variations of the basic typical magnetic disk drive storage system 200 may be used in conjunction with the present invention while keeping within the scope and intention of the invention. However, those skilled in the art will recognized that the present invention is not meant to be limited to magnetic disk drive storage systems as illustrated in FIG. 2.

Figure 3:
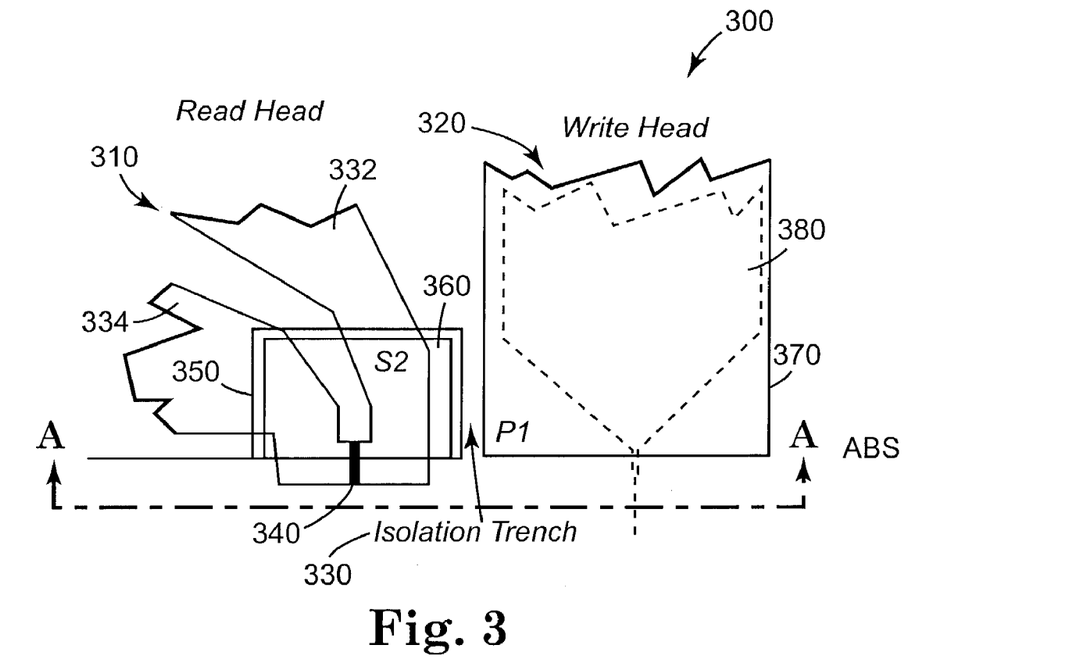
FIG. 3 illustrates a separation between a read and write structure of a side-by-side magnetic head.
Figure 4:
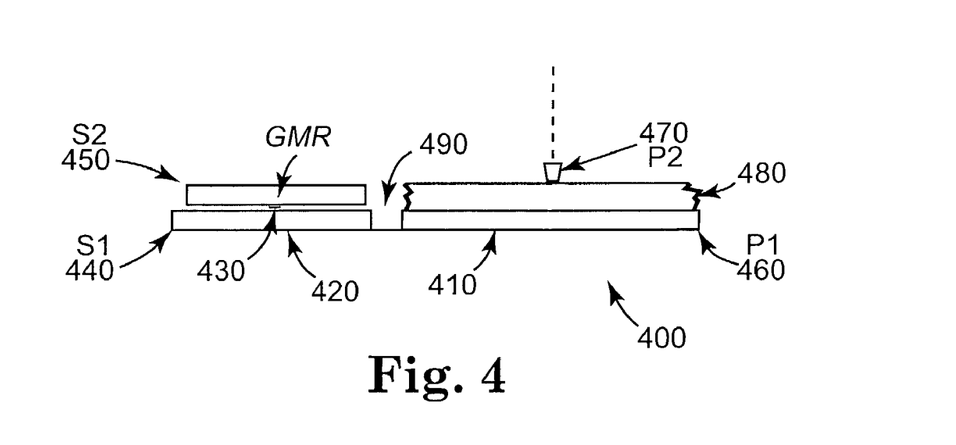
FIG. 4 is an air bearing surface (ABS) view of the side-by-side magnetic head illustrated in FIG. 3.

FIGS. 3–4 illustrate a side by side read/write head. However, FIGS. 3–4 do not show the write coil, and therefore the separation between the read element and the write tip is not shown to scale.

FIG. 3 illustrates a separation between a read and write structure of a side-by-side magnetic head 300. Separate read 310 and write 320 structures are mounted on slider (FIG. 2, 226) and are spaced apart by an isolation trench 330. A read head sensor 340 is sandwiched between a ferromagnetic first shield layer 350 and a second shield layer 360. The write head structure 320 includes a first pole piece layer 370 and a second pole piece layer 380 that is separated by a write gap layer (not shown) at an ABS. Leads 332, 334 are coupled to sensor 340.

FIG. 4 is an air bearing surface (ABS) view 400 of the side-by-side magnetic head illustrated in FIG. 3. The ABS view includes a write head portion 410 and a read head portion 420 separated by an isolation trench 490. The read head portion 420 has a sensor 430. In FIG. 4, the sensor 430 is sandwiched between at least a first shield layer (S1) 440 and a second shield layer (S2) 450. In response to external magnetic fields, a resistance of the sensor 430 changes. A sense current $I_s$ (not shown) conducted through the sensor 430 causes resistance changes of the sensor 430 to be manifested as potential changes. These potential changes are then processed as readback signals by the processing circuitry shown in FIGS. 1 and 2.

The write head portion 410 of the side-by-side magnetic head illustrated in FIG. 3 includes a first pole piece layer (P1) 460 and second pole piece layer (P2) 470. The first and second pole piece layers 460, 470 are magnetically coupled and are separated by a write gap layer 480, such as an alumina spacer, at the ABS. The first and second pole piece layers 460, 470, along with the write gap layer 480 for a perpendicular recording design (note: the large gap 480 between P1 460 and P2 470 would be used in a perpendicular recording design), form a transducing element wherein magnetic flux crosses the write gap layer 480 and creates magnetic transistions on a magnetic recording medium. However, the present invention is not limited to perpendicular recording and write head designs thereof, and can be used, for example, in other recording processes, such as longitudinal recording.

Figure 5:
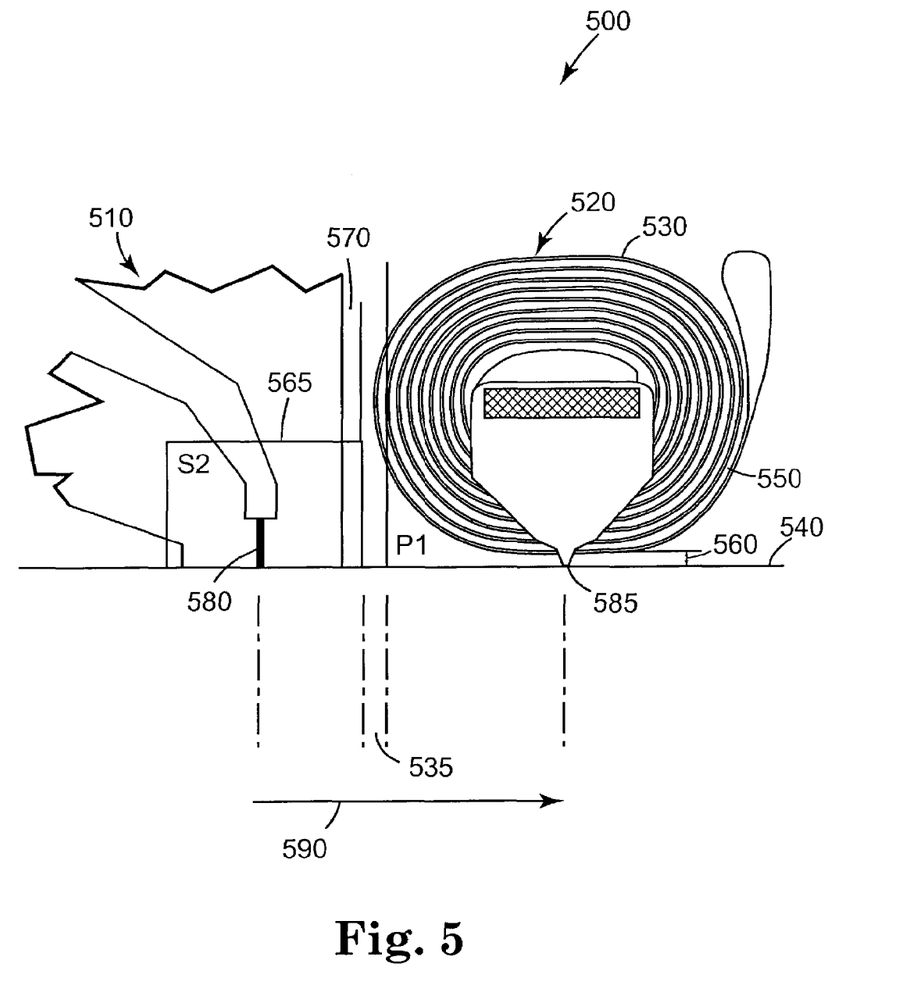
FIG. 5 illustrates a physical dimensioning of the separation between the read and write elements of a magnetic head.

FIG. 5 illustrates a physical dimensioning of the separation between the read and write elements of a magnetic head 500. The write head 520 includes a coil 530 embedded in an insulation stack, the insulation stack being sandwiched between first and second pole piece layers described in FIG. 4. Current conducted through the coil 530 induces a magnetic field into the pole pieces (FIG. 4, 460, 470) that fringes across the gap (FIG. 4, 480) between the pole pieces (FIG. 4, 460, 470) at the ABS 540. The fringe field or the lack thereof writes information in tracks on moving media, such as in circular tracks on a rotating disk (FIG. 2, 220).

As illustrated in FIG. 5, a coil 530 may be placed very close to the ABS 540 to form a separation 560. The position of the coil 530 of the write head 520 allows the coil 530 to extend sideways closer to the shields 565, 570 of the read head 510. Because full isolation is desired between the read head 510 and the write head 520, the distance 535 between the coil 530 and the shields 565, 570 should be minimized. Nevertheless, in this illustration, the separation between the read sensor 580 and the write pole 585 of this side-by-side head design creates a distance 590 that is not minimized.

Figure 6:
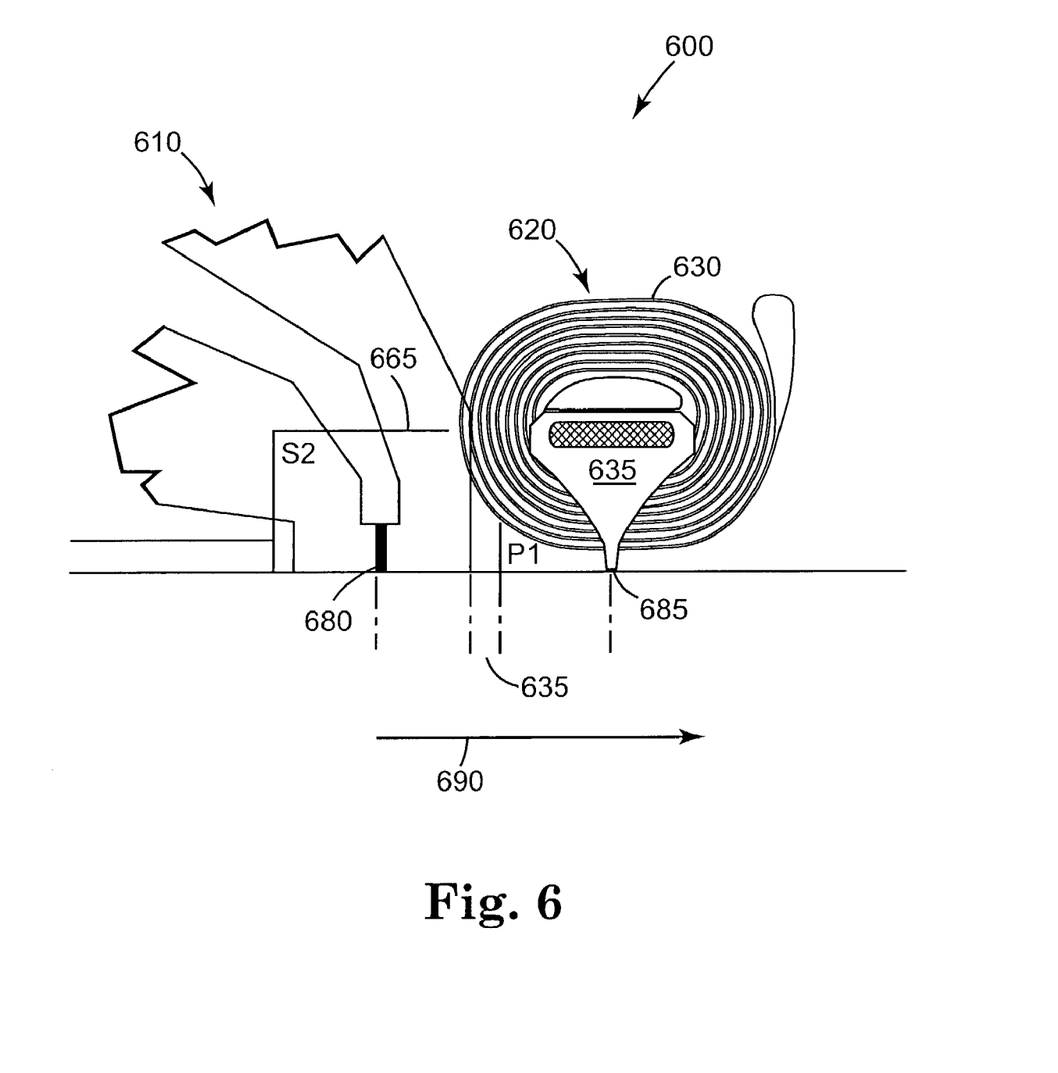
FIG. 6 illustrates a side-by-side magnetic head design having minimal isolation between the read and write head structures.

FIG. 6 illustrates a side-by-side magnetic head design 600 having minimal isolation between the read and write head structures. In FIG. 6, the coil 630 partly overlaps the second shield (S2) 665 of the read head 610 resulting in no isolation 635 between the read head 610 and the write head 620. The overlap of the coil 630 and the second shield 665 increases magnetic cross-talk between the read head 610 and the write head 620. Accordingly, the separation between the read sensor 680 and the write pole 685 coupled to a yoke 635 of this side-by-side head design creates to great of a distance 690.

Figure 7:
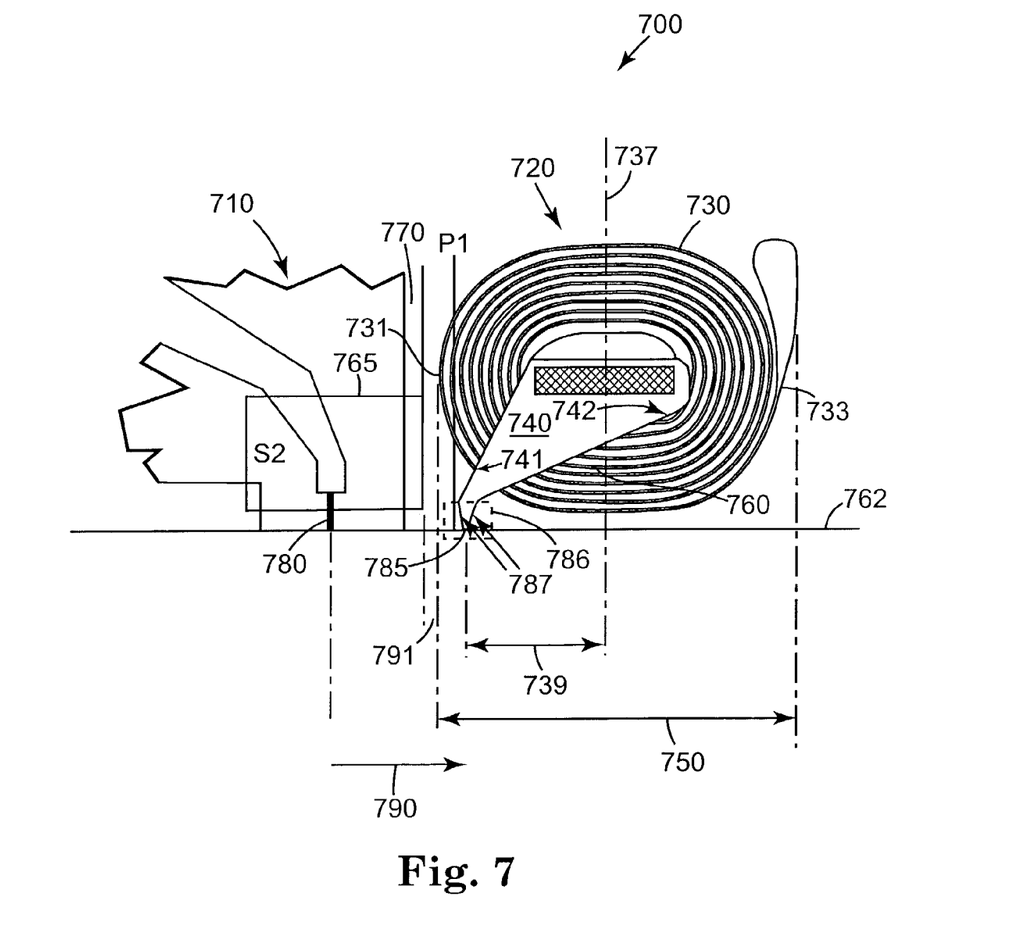
FIG. 7 illustrates a side-by-side head with a reduced separation between the read and write head structures to provide increased recording density according to the present invention.

FIG. 7 illustrates a side-by-side head 700 with a reduced separation between the read and write head structures to provide increased recording density according to the present invention. The present invention is a side-by-side magnetic head having a high resolution, high data rate head design with a very small footprint. The present invention includes a compact and high-density coil pitch (e.g., 1 µm or less) 760, which contributes to the high resolution. One of ordinary skill in the art would realize that the use of a smaller coil pitch 760 might reduce heat dissipation and create problems.

The side-by-side head 700 according to the present invention provides a read head 710 having a read element 780 and a write head 720 having a coil 730 and a pole tip 785. The coil 730 has a first side 731, a second side 733 and a central axis 737, wherein the coil's first side 731 is proximate to the read head 710. The central axis 737 is perpendicular to an air-bearing surface 762. The present invention also positions the pole tip 785 offset 739 from the central axis 737 towards the read element 780 to provide close proximity alignment between the read and write heads 710, 720. It is to be understood that close proximity alignment between the read 710 and write 720 heads refers to the offsetting of the write pole tip 785 from the central axis 737 to reduce the distance 790 between the read element 780 and the write pole tip 785.

Accordingly, modifications may be made to the shape of the conventional yoke 635 illustrated in FIG. 6 to provide for close proximity alignment between read and write heads. In FIG. 7, these modifications are made to the shape of the yoke 740 of the write head 720 because the size of the coil's footprint 750 can not be altered, i.e., the footprint 750 is fixed by the size of a magnetic back gap (i.e., opposite the end of the write gap where the pole pieces P1 and P2 join, not shown in the instant diagram) as well as the pitch of the coils 760.

Also, the modifications are made to the shape of the yoke 740 because the size of the coil 730 and the coil's necessary separation 791 from the shields 765, 770 of the read head 710 fix a distance 790 between the read head 710 and the write head 720. Thus, preventing the coil 730, and the pole tip of a conventional yoke design (FIG. 6, 685), from being moved closer to the read head 710.

In one embodiment of the present invention, a slanted yoke design 740 having a front flare 786 is utilized to position the pole tip 785 offset 739 from the central axis 737 towards the read element 780. However, the invention is not limited to this design. This design also uses, but is not limited to, conventional flare sides 787 that are close to the ABS 762. In this conventional flare design, both sides 787 of the flare 786 are slanting at the same angle to the central pole 785.

In FIG. 7, the slanted yoke design shows that the sides 741, 742 of yoke 740 of the write head 720 are angled to position the pole 785 of the write head 720 offset 739 from a central axis 737 in a direction towards the sensor 780 of the read head 710. This design produces a considerable reduction in the distance 790 between the read sensor 780 and the write pole 785. It follows that this design will also provide a reduction in the distance between tracks on a disk's surface (FIG. 2, 230) because of the physical reduction in the distance between the read and write heads 710, 720 of the side-by-side head structure 700.

According to the present invention, even when the same coil footprint 750 and pitch 760 of a conventional shaped coil (with a separation 791 of 4.0 μm between a write head coil 730 and a read head shield 765, 770) is maintained, the distance 790 between the read sensor 780 and the write pole 785 is reduced. For example, the distance 790 between the read sensor 780 and the write pole 785 may be reduced.

Furthermore, according to the present invention, this design of the side-by-side head structure of FIG. 7 maintains full thermal benefits of improved heat dissipation produced by the coil 730, because the coil 730 can be placed very close to the slider body (FIG. 2, 226).

Figure 8:
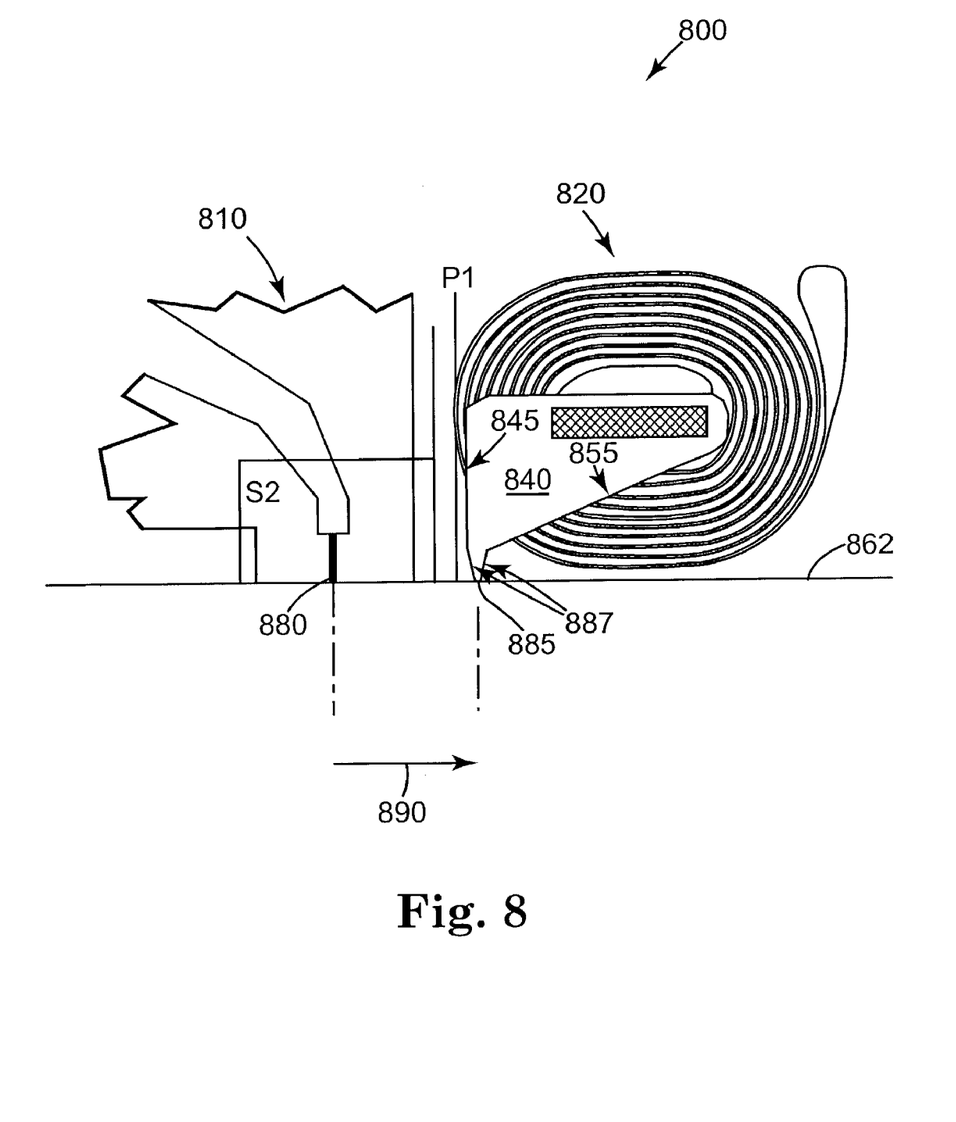
FIG. 8 illustrates an alternate embodiment of a side-by-side yoke design according to the present invention.

FIG. 8 illustrates an alternate embodiment 800 of a side-by-side yoke design according to the present invention. In FIG. 8, the design of the side-by-side yoke 840 has the same slanted flare angle 887 as illustrated in FIG. 7. In FIG. 8, the write pole 885 of the write head 820 is positioned at the same distance 890 from the sensor element 880 of the read head 810 as described in FIG. 7.

However, the slanted yoke 840 is modified to position one side 845 of the yoke 840 perpendicular to the ABS 862 and another side 855 of the yoke 840 will form an angle (canted) to the ABS 862. However, the present invention is not limited to this shape.

Figure 9:
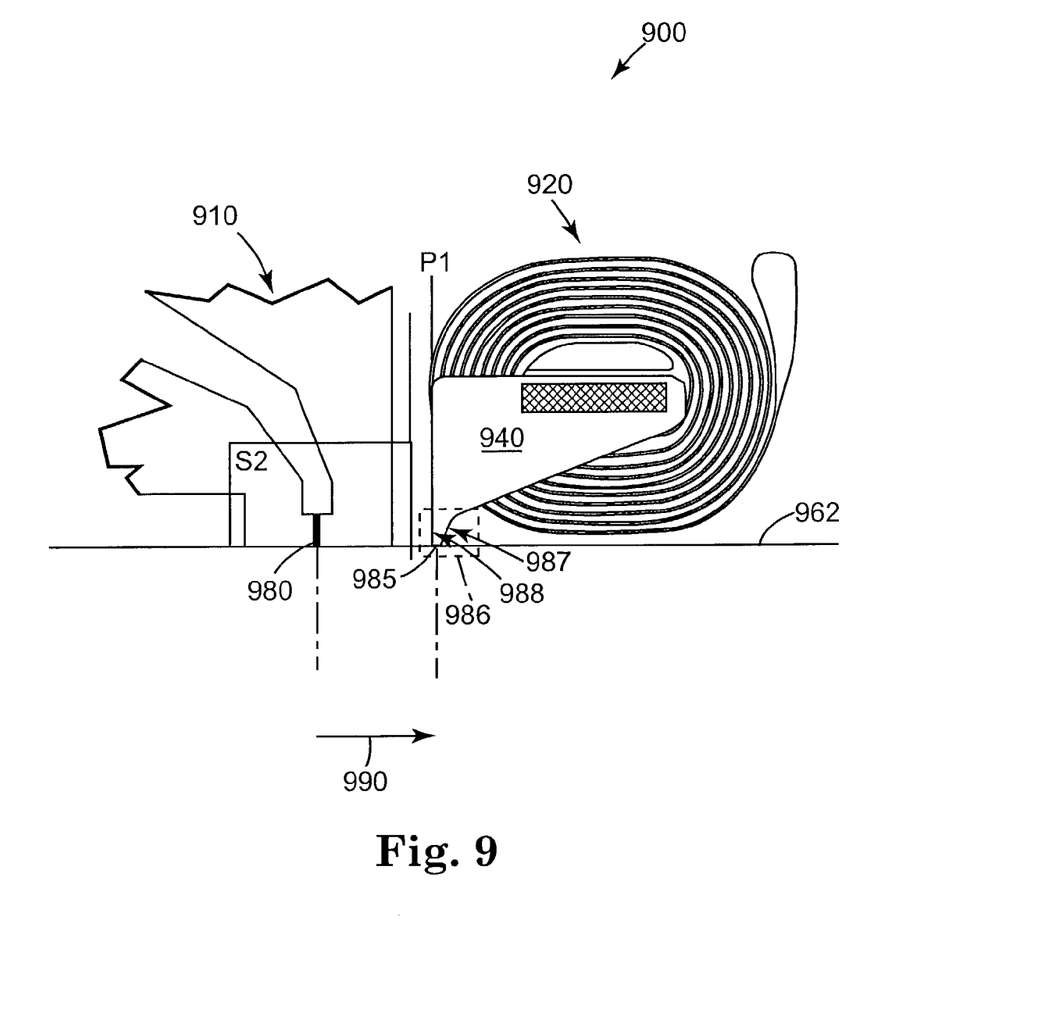
FIG. 9 illustrates another alternate embodiment of the side-by-side yoke design according to the present invention.

FIG. 9 illustrates another alternate embodiment 900 of the side-by-side yoke design according to the present invention. In FIG. 9 the yoke 940 of the write head 920 includes a flare 986 having just one side 987 of the flare angled to the ABS 962. The other side 988 of the flare 986 is perpendicular to the ABS 962. In this alternate embodiment, the separation 990 between the read sensor 980 of the read head 910 and the write pole 985 is reduced further.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A side-by-side read/write head, comprising:
a magnetoresistive read head having a magnetoresistive read element formed proximate an air bearing surface (ABS) for only detecting data written on a magnetic recording medium;
a write head, disposed adjacent the magnetoresistive read head, for only recording data on a magnetic recording medium, the write head having a coil and a pole tip coupled thereto, wherein the coil has a first side and a central axis perpendicular to the ABS, the first side being adjacent to the magnetoresistive read head; and
an isolation trench between the magnetoresistive read head and the write head for preventing magnetic cross-talk between the magnetoresistive read head and the write head;
wherein the pole tip is disposed offset from the central axis towards the magnetoresistive read element to provide close proximity alignment between the magnetoresistive read head and the write head.

2. The side-by-side read/write head of claim 1, wherein the pole tip is disposed in alignment with the first side of the coil proximate an air-bearing surface.

3. The side-by-side read/write head of claim 2, wherein the write head further comprises a yoke, wherein the yoke couples the pole tip to the coil, the yoke being disposed over the coil only on the side toward the magnetoresistive head.

4. The side-by-side read/write head of claim 3, wherein the yoke further includes a first side and a second side, wherein the first and second sides of the yoke form an angle to the ABS.

5. The side-by-side read/write head of claim 3, wherein the yoke further includes a first side positioned at the first side of the coil perpendicular to an ABS and a second side forming an angle to the ABS.

6. The side-by-side read/write head of claim 3, wherein the yoke further comprises a flare at the pole tip end of the yoke, wherein the flare has a first and second side forming an angle with the ABS.

7. The side-by-side read/write head of claim 3, wherein the yoke further comprises a flare at the pole tip end of the yoke, wherein the flare has a first and second side, wherein the first side is positioned at the first side of the coil and the second side forms an angle with the ABS.

8. The side-by-side read/write head of claim 1, wherein the isolation trench further includes a fixed distance between the first side of the coil and a shield of the magnetoresistive read head for preventing magnetic cross-talk between the magnetoresistive read head and the write head.

9. A magnetic storage system, comprising:
a moveable magnetic storage medium;
an actuator; and
a side-by-side read/write head coupled to the actuator, wherein the side-by-side read/write head further comprises:
a magnetoresistive read head having a magnetoresistive read element formed proximate an air bearing surface (ABS) for only detecting data written on a magnetic recording medium;
a write head, disposed adjacent the magnetoresistive read head, for only recording data on a magnetic recording medium, the write head having a coil and a pole tip coupled thereto, wherein the coil has a first side and a central axis perpendicular to the ABS, the first side being adjacent to the magnetoresistive read head; and an isolation trench between the magnetoresistive read head and the write head for preventing magnetic cross-talk between the magnetoresistive read head and the write head;

wherein the pole tip is disposed offset from the central axis towards the magnetoresistive read element to provide close proximity alignment between the magnetoresistive read head and the write head.

10. The magnetic storage system of claim 9, wherein the pole tip is disposed in alignment with the first side of the coil proximate an air-bearing surface.

11. The magnetic storage system of claim 10, wherein the write head further comprises a yoke, wherein the yoke couples the pole tip to the coil, the yoke being disposed over the coil only on the side toward the magnetoresistive head.

12. The magnetic storage system of claim 11, wherein the yoke further includes a first side and a second side, wherein the first and second sides of the yoke form an angle to the ABS.

13. The magnetic storage system of claim 11, wherein the yoke further includes a first side positioned at the first side of the coil perpendicular to an ABS and a second side forming an angle to the ABS.

14. The magnetic storage system of claim 11, wherein the yoke further comprises a flare at the pole tip end of the yoke, wherein the flare has a first and second side forming an angle with the ABS.

15. The magnetic storage system of claim 11, wherein the yoke further comprises a flare at the pole tip end of the yoke, wherein the flare has a first and second side, wherein the first side is positioned at the first side of the coil and the second side forms an angle with the ABS.

16. The magnetic storage system of claim 9, wherein the isolation trench further includes a fixed distance between the first side of the coil and a shield of the magnetoresistive read head for preventing magnetic cross-talk between the magnetoresistive read head and the write head.

17. A side-by-side read/write head, comprising:

magnetoresistive reading means, formed at proximate an air bearing surface (ABS), for only detecting data written on a magnetic recording medium;

writing means, disposed adjacent the magnetoresistive reading means, for only writing data to a magnetic recording medium, the writing means including a magnetic field generating means and transducing means, wherein the magnetic field generating means includes a first side and a central axis perpendicular to the ABS, the first side being adjacent to the magnetoresistive reading means;

an isolation trench disposed between the magnetoresistive reading means and the writing means for preventing magnetic cross-talk between the magnetoresistive reading means and the writing means;

wherein the transducing means is disposed offset from the central axis towards the magnetoresistive reading means to provide close proximity alignment between the magnetoresistive reading means and the writing means.

* * * * *